Oct. 14, 1969   HIROMICHI TOYODA ET AL   3,472,071
APPARATUS FOR HIGH-ACCURACY AND QUICK-RESPONSE
DETECTION OF THE CALORIFIC VALUE OF A GAS
Filed May 23, 1966   3 Sheets-Sheet 1

Hiromichi Toyoda,
Kazuo Tayama,
Yoshitoshi Miyazaki,
Keiichi Hinohara and
Hisao Suzuki
INVENTOR BY Wenderoth, Lind & Ponack
ATTORNEYS

United States Patent Office 3,472,071
Patented Oct. 14, 1969

3,472,071
APPARATUS FOR HIGH-ACCURACY AND QUICK-RESPONSE DETECTION OF THE CALORIFIC VALUE OF A GAS
Hiromichi Toyoda and Kazuo Tayama, Tokyo, Yoshitoshi Miyazaki, Kitakyushu, Keiichi Hinohara, Tokyo, and Hisao Suzuki, Kitakyushu, Japan, assignors to Yawata Iron & Steel Co., Ltd., and Mitaka Instrument Co., Ltd., both of Tokyo, Japan
Filed May 23, 1966, Ser. No. 552,314
Claims priority, application Japan, Nov. 26, 1965, 40/72,361
Int. Cl. G01k 17/08
U.S. Cl. 73—190      4 Claims

ABSTRACT OF THE DISCLOSURE

The present invention relates to an improvement of the apparatus for quick response and accurate calorimetry of combustible gases when operating continuously. This is achieved essentially by the distribution of air supply in three flows, that is, the first, the second, and the third air flow, respectively, totally in a certain volumetric proportion to a sample gas, the first air flow to be mixed with the sample gas, this gas mixture to be completely burnt with the help of the second air flow, and the combustion gas to be diluted with the third air flow before measuring the temperature of the combustion gas.

---

The present invention relates to an apparatus for continuous detection of the net calorific value of a combustible gas with high accuracy and quick response.

The present invention aims to detect the calorific value of a measuring gas by dividing the air flowing at a constant volume rate into the first, second and third airs, mixing the measuring gas with the first air, burning the air-added gas perfectly with the second air in the combustion part of a gas calorific value detecting apparatus, diluting the perfect-combustion gas with the third air jetted from around the combustion gas flow at a high speed so that the combustion gas and air are mixed confusedly, injecting the air-diluted combustion gas through a multiplicity of holes made in the wall of a tapered pipe which is a component of the temperature detecting or sensing part of said detecting apparatus into a pipe placed outside the taper pipe while directing the diluted combustion gas upwards in the taper pipe, and measuring the difference of temperature between the third air and diluted combustion gas by means of two thermocouples provided one near the third air inlet and the other in the temperature detecting part. In addition, the response characteristics of the detecting apparatus can be improved by combining derivative action thermocouples with the thermocouple provided in the temperature detecting part. Besides, by attaching a preheater to the gas burner, even a gas having a low calorific value can have the value measured with ease.

Generally the continuous detection or control of the calorific values of combustible gases with high accuracy and quick response is very important for their commercial transaction, chemical processing and quality control.

In the conventional methods and apparatus for continuous detection of the calorific value of a combustible gas, the value is detected by subjecting the combustible gas supplied in a constant state to perfect combustion, absorbing the combustion heat constantly into a heat absorbing medium, and continuously measuring the rise in temperature of the medium.

In the case where a large amount of air is used as the above-mentioned heat absorbing medium, the net calorific value of the combustible gas can be measured continuously by subjecting the gas sample to perfect combustion with part of the air, mixing the perfect-combustion gas with the remaining air so that heat conduction takes place between the gas and air, and detecting the difference of temperature between the air-mixed combustion gas and the supplied air.

In the above stated prior methods and apparatus, such various improving procedures or means as described below are devised. A process employed for the combustion gas to be mixed well with the air is the one in which the combustion gas is divided so as to flow into several nozzles and discharged into the air flow. Since it is difficult to divide the combustion gas equally, it is also difficult to obtain a uniform temperature throughout the passage of the mixture gas, and further, the thermal capacity of the combustion-gas distributing nozzles adversely affects the temperature response characteristics.

Besides, there is the method in which the combustion-gas and air passages are narrowed at the mixing spot so as to enhance the mixing effect. However, because of said narrowing, there occurs the heat conduction to the narrowed passage portions, which thus exhibit a considerable heat capacity and, just as in the above case, have adverse influence upon the response characteristics.

There is also a method of surrounding the mixture-gas passage with a heat insulator in order for the ambient temperature to have no influence upon the gas in and near the temperature detecting part. However, the thermal capacity of the heat insulating material in use and the radiation from the said material impair the response characteristics. Besides, there exists a process of suppressing the influence of the ambient temperature by providing a covering pipe small in heat capacity so as to bring about a gentle temperature gradient between the mixture gas and the surrounding atmosphere. Nevertheless, the process is beset with the drawbacks that the period of time required for the thermal equilibrium to be reached is long and that a temperature gradient comes into existance in the vertical direction also.

Generally, the necessity of maintaining stable and perfect combustion in the combustion part makes it difficult to feed a large amount of air directly into the burning part. Such being the case, the temperature of the surrounding wall of the combustion part is increased considerably by the heat radiation of the flame and the heat conduction from the high-temperature combustion gas. It is therefore common practice to cover the combustion chamber with an air passage to decrease the temperature of the partition wall; however, this method also has the defect that thermal conduction occurs from the combustion gas to the wall of the outer pipe defining the air passage, resulting in a drop in temperature between the combustion part and the temperature detecting part.

As stated above, the prior methods are all beset with the defective feature that the response is retarded if high accuracy is aimed at, while the accuracy is lowered if aim is taken at quick response.

The present invention aims to provide an apparatus for high-accuracy and quick-response measurement of the calorific value of a gas by overcoming the above described conventional demerits.

The characteristic features of the present invention are as stated below.

The present invention contemplates to mix the combustion gas resulting from the perfect combustion of a measuring gas by the supply of the first and second airs with a large quantity of the third air rapidly under no influence of the surroundings by, instead of providing the combustion-gas passage with a heat exchanger, gas distributor, agitator and so on, injecting the third air abundantly at a high speed from a perforated taper pipe towards the center line of the combustion gas flow to dilute the combustion gas with the third air, and guiding the diluted gas upwards in a perforated thin-wall taper pipe provided in the temperature detecting or sensing part as the inner pipe of said part while jetting some of the upwardly flowing gas radially through the small holes made in the thin wall of the taper pipe. The diluted combustion gas thus guided and jetted after having arrived at the temperature detecting part is prevented from passing upwards in a simple manner and the quantity of heat possessed by the air-diluted combustion gas is given to the inner and outer pipes of the temperature sensing part so as to raise the temperature in the sensing part rapidly up to the air-diluted combustion gas temperature, with the result that the temperature gradient in the inner pipe of the detecting part is so small in both vertical and radial directions as to allow high-accuracy measurement.

As stated above, the temperature of the combustion gas is lowered by diluting the combustion gas with a large amount of the third air; therefore, the thermal radiation and conduction to the surroundings decrease in amount and the lifetime of the thermocouples increases. In addition, since the flow rate of the combustion gas increases, the temperature gradient in the direction of the gas flow is extremely lessened, so that the calorific value measurement is free from the error due to the vertical displacement of the thermocouple setting position as well as quick in response.

Furthermore, since the specific heat of the combustion gas diluted with the third air is virtually equal to that of the air, the error in calorific value measurement due to the variation in the composition of the measuring gas can be lessened to an extremely small value.

Next, the present invention contemplates to add derivative action thermocouples to the temperature-measuring thermocouple set in the temperature sensing part so that the response characteristics may be excellent.

Moreover, in the present invention, the temperature detecting part may have its outer pipe covered with a thin-multiwall pipe which serves for the flow of the diluted combustion gas to invert its course or to turn downwards, thus preventing the heat conduction from the outer pipe to the ambient air and improving the accuracy and response characteristics.

Furthermore, it is also possible in this invention to attach a heat-resisting, anticorrosive covered heater to the burner, which has a thin wall made of such a material as stainless steel, so as to raise the temperature of the measuring gas and the first and second airs, and to add oxygen instead of the first air to the measuring gas so that the gas, even if low in calorific value, may be easy to ignite and stable in combustion, and further to provide an electric circuit which compensates the amount of heat given to the gas and air by the heater so as to allow automatic detection of the calorific value of the measuring gas especially when the value is low.

The characters of the present invention will be more fully understood by reference to the following detailed description taken in conjunction with the accompanying drawings, in which.

Figure 1:
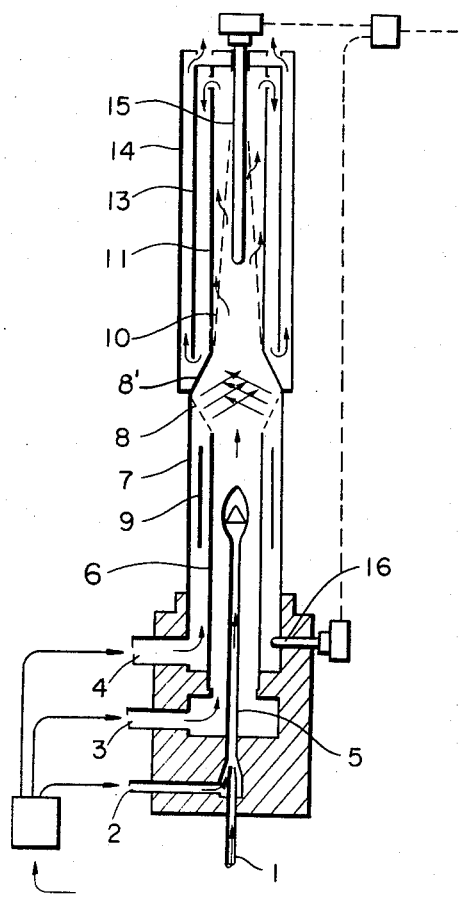
FIG. 1 is a schematic view showing an apparatus embodying the principles of the present invention.

The sample gas of which the calorific value is to be measured, the first and second airs to be used to burn the gas perfectly and the third air for dilution of the combustion gas are supplied continuously at a constant volume rate each by means of such distributing and inatke devices as will be described later. Referring now to FIG. 1, the sample gas thus sent to the apparatus is passed through the gas inlet 1 into a burner pipe 5 and rises in the pipe 5 while being mixed with the air having entered at the first air inlet 2. The air-added gas is perfectly burnt at the top end of the burner pipe 5 with the second air passed through the second air inlet 3 and made to rise up between the burner pipe 5 and the combustion pipe 6 surrounding the former pipe 5. Thus the sample gas is perfectly or completely burnt with the first and second airs, and thereafter the perfect-combustion gas further rises up in the combustion pipe 6.

The third air for dilution enters the apparatus at its inlet 4 and flows upwards between the combustion pipe 6 and a third air pipe 7 surrounding the former pipe as the outer pipe of the combustion part of the apparatus, and jets through many holes made in an inverse-cone type air injection pipe 8 having the lower end fixed to the top of the combustion pipe 6 and the upper end to the third air pipe 7 of the combustion part into the combustion gas flow obliquely upwards at a high speed. The provision of the air injection taper pipe 8 is one of the features of the present invention, and since the third air is separated into many small air flows and injected from around the combustion gas flow towards the center line, the combustion gas and the third air are mixed confusedly so that the gas is diluted rapidly with the air. Furthermore, since the air jets are directed obliquely upwards, the combustion gas is scarcely prevented from rising up.

A diluted-combustion-gas guidance taper pipe 8' converging upwardly is interposed between and connects the upper end and lower end respectively of the third air pipe 7 and the exhaust pipe 11. This taper pipe 8' serves to generally funnel the upwardly moving air-diluted combustion gas and to sufficiently intermix it with the third air flow.

Most of the combustion heat of the sample gas is carried by the uprising combustion gas, while part of the heat is conveyed to the burner pipe 5, and the combustion pipe 6 and the like and thus raises the temperature of these heat receiving bodies. With the heat receiving bodies raised in temperature, the subsequent sample gas and air absorb heat from said bodies so that the amount of heat entering the receiving bodies soon comes in equilibrium with that leaving said bodies. In addition, since the combustion pipe 6 is considerably high in temperature where burning takes place, the radiation heat is received by a radiation shield pipe 9 provided between the combustion pipe 6 and the third air pipe 7 of the combustion part and the heat thus received is given to the third air so that the radiation heat may not run through the third air pipe 7.

Thus, once the thermal equilibrium is reached, all the combustion heat, some sent through the heat receiving bodies and the rest carried by the uprising combustion gas, is given to the air-diluted gas. Then the diluted gas, or the combustion gas mixed and diluted sufficiently with the third air, flows up into the temperature detection taper pipe 10 of the temperature detecting part, said taper pipe 10, being one of the characteristics of this invention.

The inner pipe 10 of the temperature detecting part has a tapered thin wall in which many small holes are made. Accordingly, the diluted gas is partly jetted out radially from the small holes while rising in said taper pipe 10, and, after having dashed agent the inside wall surface of the detecting-part exhaust pipe 11 surrounding said taper piper 10, moves upwards again inside the exhaust pipe 11. The amount of heat possessed by the diluted gas flowing as mentioned above is effectively given to said taper and exhaust pipes 10 and 11, and thus the temperature of said taper pipe 10 reaches rapidly to that of the diluted gas and the temperature of the exhaust pipe 11 also approaches that of said gas. Consequently, there is virtually no temperature gradient in both radial and vertical direction inside of said taper pipe 10, and therefore high-accuracy measurement is possible.

In the apparatus shown in FIG. 1, the combustion waste gas is made to invert its flow course in order to ensure the above-mentioned effect of the present invention, that is, the effect of allowing no temperature gradient to exist in said taper pipe 10. More particularly, the upper end of the exhaust pipe 11 of the detecting part is made higher than that of said taper pipe 10, and the hot waste gas is made to flow upwards over said taper pipe 10 and then to turn downwards between the exhaust pipe 11 of the detecting part of the inside wall surface of an assembly of double pipes 13 and 14 which surrounds the detecting-part exhaust pipe 11 and thereafter to rise up again between the said double pipes 13 and 14. In the present invention, however, the construction for the combustion waste gas to invert its flow course may be replaced by such one that the exhaust pipe 11 of the detecting part is covered by only an ambient-air shielding pipe (not shown) or the like so as not to be affected by the ambient temperature and that the waste gas is exhausted upwards directly from said exhaust pipe 11.

As mentioned above, the temperature distribution in said taper pipe 10 of the temperature detecting part is uniform and the temperature itself is stable, so that it is made possible, by placing a temperature detecting element preferably in the form of a thermocouple 15 for temperature detection in the virtually central position, to make high-accuracy and quick-response detection of the temperature.

Figure 3:
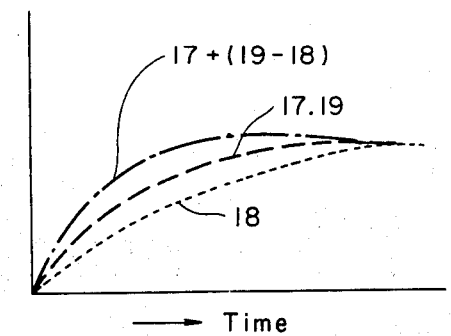
FIG. 3 is a working diagram for the derivative action thermocouples shown in FIG. 2.

Nevertheless, because of the heat capacity of the heat receiving bodies such as the passage-defining pipes and the surrounding wall of the combustion part, a transient response is shown before the diluted gas temperature following the combustion heat reaches its end point. However it is possible in this invention to improve the transient response of the detection output by connecting derivative action thermocouples in series with the temperature measuring thermocouple provided in the temperature detecting part. Namely, a thermocouple 18 of the same kind as the temperature measuring thermocouple 17 and having a junction of which the thermal capacity is about twice as large as that of the temperature measuring contact point of the thermocouple 17 is arranged in the polarity reversed to that of the thermocouple 17, and another thermocouple 19 of the same kind as the temperature measuring thermocouple 17 and having the same heat capacity as the latter is connected in series and in the same polarity as the thermocouple 17. When there occurs a change in temperature, the thermoelectromotive force of the thermocouple 18 is, as seen in FIG. 3 preceded in change by that of the thermocouple 19. Therefore the difference between the thermoelectromotive forces of the thermocouples 18 and 19 is added, as the derivative value of the temperature change, to the force of the thermocouple 17 so as to improve the response characteristics in the transient period. When the temperature becomes constant after the lapse of a short time, there no longer exists any difference of thermoelectromotive force between the thermocouples 18 and 19 and only the thermoelectromotive force of the thermocouple 17 arises, so that there occurs no temperature measurement error in the steady period.

So far has been mainly described a measure for detecting the diluted gas temperature raised by the combustion heat. However, the object of the detection is the temperature rise of the medium (the diluted gas in the present description) and therefore it goes without saying that the difference of temperature between the diluted gas and the supplied air must be measured.

Figure 2:
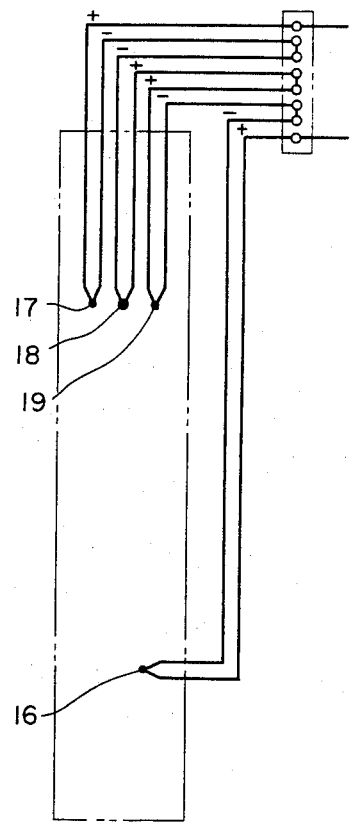
FIG. 2 is a circuit diagram showing the wiring of the derivative action thermocouples used in this invention to measure the temperature of the air-diluted combustion gas.

In the embodiment of the present invention, a temperature detecting element preferably in the form of a thermocouple 16 is provided immediately after the third air inlet 4 for detecting the temperature of the supplied air, and the junction of the thermocouple 16 is used as the cold one, while those of the thermocouple 17 and the derivative action thermocouples 18 and 19 serve as the hot junction. With the connection shown in FIG. 2, the difference of electromotive force between the thermocouple 16 and the hot-junction thermocouple group refers to the temperature rise to be detected.

Figure 6:
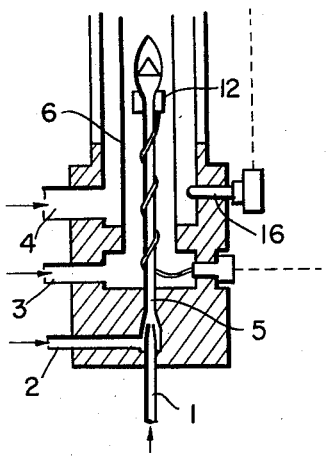
FIG. 6 illustrates an exemplary preheater device in this invention.

Next, in the case where the sample gas has a low calorific value, a heater covered with a heat resisting and anticorrosive heating wire 12 is wound, as shown in FIG. 6, in an insulated state around the burner pipe in which the sample gas is mixed with the first air or that to which oxygen is added, in order to heat the sample gas, the first air with or without the additional oxygen and the second air simultaneously so that perfect combustion may be stably maintained. Besides, in order for the calorific value of the sample gas to be indicated or recorded correctly, a device which automatically compensates the temperature rise due to the heat given by the heater is attached to the present calorific-value detecting apparatus.

Hereunder will be explained an exemplary constant-volume pumps used in the present apparatus to keep the measuring gas and the total air of the first, second, and third airs at a constant flow rate each.

Figure 4:
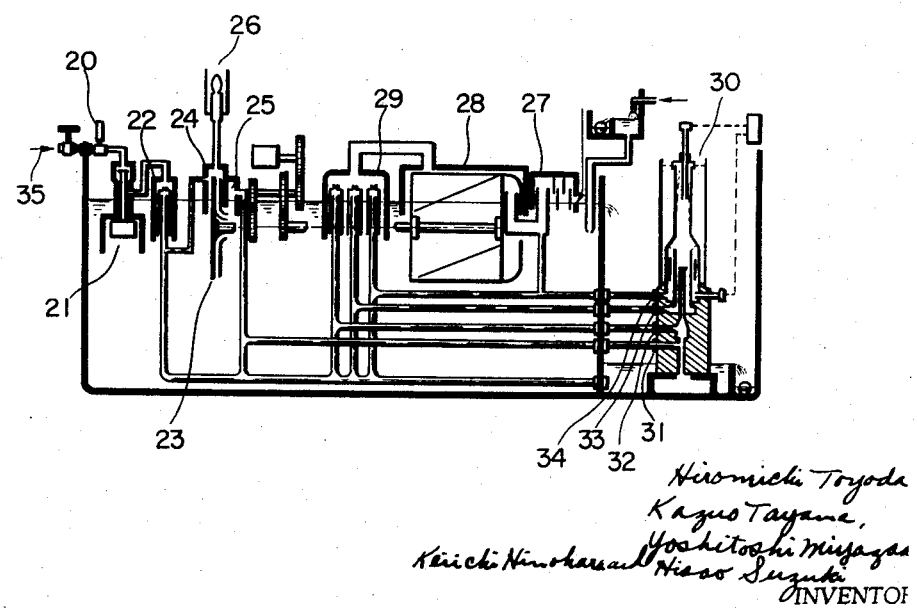
FIG. 4 is a view illustrating a total system which incorporates an embodiment of the present invention.

In the total system shown in FIG. 4, the measuring gas 35 passes a solenoid valve 20 and enters a gas pressure regulator 21, from which the gas flows through an orifice 22 under a constant pressure and enters the primary side chamber 24 of a gas constant volume pump 23. Some of the gas comes out of the secondary side chamber 25 of the pump 23 at a flow rate proportional to the revolving speed of the pump and is sent to the gas inlet 31 of the combustion heat detecting apparatus 30 as the sample gas of which the calorific value is to be detected. The remaining part of the gas is guided into a bleeder burner 26 and exhausted while burning. Since the gas pressure regulator 22 and gas pump 23 are each of a wet type, the gas has the saturation humidity at the water temperature. Furthermore, the orifice 22 and bleeder burner 26 serve to allow the gas to have a pressure almost equal to the atmospheric one in the primary side chamber 24 of the gas pump 23. In short, the sample gas is taken in at a constant volume flow rate in the conditions that the pressure is virtually equal to that of the outer air, the temperature is the same with that of the water and the humidity has the saturation value at the water temperature. In addition, since part of the measuring gas is kept flowing into the bleeder burner 26 through the primary side chamber 24 of the gas pump 23, the period of time required for the gas to reach the gas inlet is shortened as compared with that when all the gas is utilized only for the combustion heat detecting apparatus 30.

On the other hand, the total volume of air used for perfect combustion of the gas and dilution of the combustion gas is passed through a damping chamber 27 into an air constant volume pump 28, and then sent at a flow rate proportional to the revolving speed of the pump to an air distributor 29, where the air is divided into the first, second and third airs, which are passed on to the respective inlets 32, 33 and 34 of the combustion heat detecting apparatus. The damping chamber makes the temperature of the air coincide with that of the water and the humidity approach the saturation value at the water temperature; thus all the devided airs are each supplied at a constant volume flow rate in the conditions that the pressure is almost equal to that of the atmosphere, the temperature is identical with that of the water and the humidity has the humidity has the saturation value at the water temperature.

Figure 5:
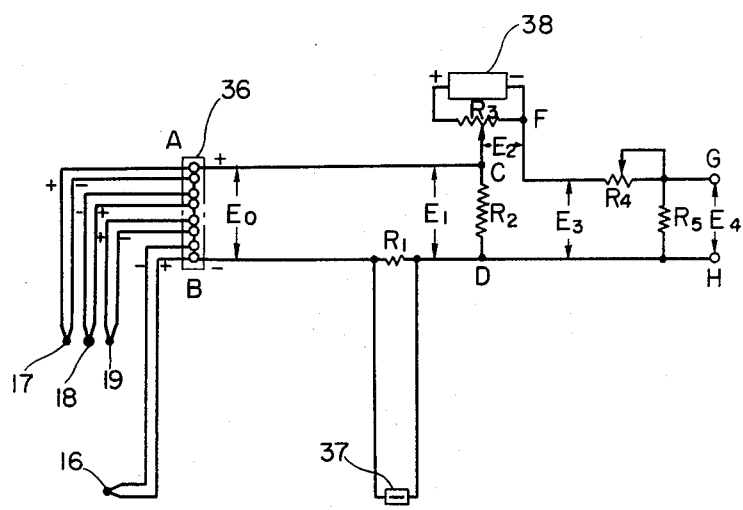
FIG. 5 is a diagram showing a calorific-value measuring circuit devised in this invention.

FIG. 5 shows an exemplary calorific-value signaling circuit. A voltage $E_0$ corresponding to the combustion heat is detected between both terminals A and B of a terminal strip 36 by means of the thermocouple 17, the derivative action thermocouples 18 and 19 and the thermocouple 16 in the combustion heat detecting apparatus. By utilizing a thermistor 37 which changes in resistance with the change of the water temperature and by choosing an adequate value for a resistor $R_1$, humidity compensation is made so that a voltage $E_1$ proportional to the calorific value of the sampl egas is detected between both ends C and D of a resistor $R_2$. The circuit incorporates the combination of a constant-voltage device 18 and a resistor 3 so that a voltage $E_3$ which is the voltage $E_1$ minus the constant voltage $E_2$ is obtained. By adjusting the value of a variable resistor $R_4$, a voltage $E_4$ proportional to the voltage $E_3$ is detected between both ends G and H of a fixed resistor $R_5$. Accordingly, by determining the circuit constants adequately, the value of the voltage $E_4$ can be made to serve as the calorific-value signaling output which meets the input span of a calory indicating instrument.

burner pipe and said combustion pipe and means for burning this air-added sample gas completely with the second air flow at the top of said burner pipe, the upper end of said combustion pipe being made higher than the top of said burner pipe, (d) a third air pipe surrounding said combustion pipe for guiding a third air flow upwards between said combustion pipe and said third air pipe, the upper end of said third air pipe being made higher than the upper end of said combustion pipe, (e) an air injection taper pipe covering and disposed between the upper end of said third air pipe and the upper end of said combustion pipe and having many small holes in the wall for jetting the third air flow into many separated small air flows through said many small holes in the combustion gas flow obliquely upwards at a high speed so that the combustion gas is mixed and diluted rapidly with the third air flow,

EXAMPLE 1

[Table of comparison of the characteristics of an apparatus embodying this invention with those of conventional apparatus]

| | Classification | | |
|---|---|---|---|
| | | Conventional apparatus | |
| Items | An apparatus embodying the present invention | An apparatus with emphasis on accuracy (A) | An apparatus with emphasis in response speed (B) |
| Measuring accuracy | Indicated value ±0.5% | Indicated value ±0.5% | Indicated value ±2%. |
| Indicial response: | | | |
| Dead time | 0.3–0.4 min | 1.5–5 min | 0.3–0.4 min. |
| Time constant | 0.2–0.3 min | 3–4 min | 0.3–0.8 min |
| Lowest measurable calorific value of gas | 600 Kcal./Nm.³ | 1,000 Kcal./Nm.³ | 800 Kcal./N,m³ |
| Setting Location | Out-of-doors | A constant-temperature room | Out-of-doors. |

NOTE —(A) = A method by measuring the temperature rise of the air flow receiving the combustion heat indirectly through the partition wall. (B) = A method by measuring the temperature rise of the air flow into which the combustion gas flows simply through several nozzles.

EXAMPLE II

| | Number | | | | | | |
|---|---|---|---|---|---|---|---|
| | 1 | 2 | 3 | 4 | 5 | 6 | 7 |
| | Designation | | | | | | |
| | Town gas plus $N_2$ | Coke oven gas plus $N_2$ | Blast furnace gas plus $N_2$ | Blast furnace gas plus coke oven gas | Blast furnace gas | Town gas | Natural gas |
| Composition | | | | | | | |
| $H_2$ | 3.64 | 6.132 | 1.8 | 2.0 | 2.0 | 26 | |
| CO | 0.84 | 0.720 | 18.9 | 21.0 | 21.0 | 6 | |
| $CH_4$ | 3.64 | 3.648 | 0.9 | .05 | 1 | 26 | 93 |
| $C_2H_4$ | | 0.34 | | | | | |
| $C_3H_6$ | 0.98 | | | | | 7 | 1 |
| $O_2$ | 0.84 | 0.036 | | | | 6 | |
| $N_2$ | 89.22 | 88.798 | 59.5 | 55.2 | 55 | 23 | |
| $CO_2$ | 0.84 | 0.252 | 18.9 | 21.3 | 21 | 6 | 2 |
| $C_2H_6$ | | | | | | | 4 |
| Total in voltage, percent | 100 | 100 | 100 | 110 | 100 | 100 | 100 |
| Calculated calorific value (net) Kcal./Nm³ | 633.4 | 561.9 | 696.8 | 731.3 | 774 | 5,524 | 8066 |
| Measuring conditions: | | | | | | | |
| Gas flow, l./min | 1 | 1 | 1 | 1 | 1 | 0.5 | 0.25 |
| Air supply capacity, l./min | 50 | 50 | 50 | 50 | 50 | 50 | 50 |
| Preheater, Wattage | 50 | 50 | 50 | 50 | 50 | | |
| Air addition rate, l./min | 0.0566 | 0.0566 | 0.0566 | | | | |
| Room temperature, C° | 23 | 25 | 25 | 25 | 20 | 21 | 18 |
| Indicated value (net), Kcal./Nm.³ | 632 | 562 | 697 | 73 | 772 | 4,525 | 8,770 |

Remarks.—The calorific value of each component in Kcal./Nm³ (net): $H_2$=2,570; CO=3,034; $CH_4$=8,562; $C_2H_4$=13,938; $C_2H_6$=14,908; $C_3H_6$=20,680.

What is claimed is:

1. An apparatus for high-accuracy and quick-response detection of the calorific value of a combustible gas comprising, in combination:
   (a) inlet means for receiving a gas sample of the combustible gas, and inlet means for receiving separated first, second and third air flows,
   (b) a burner pipe for guiding sample gas upwards and including means for mixing the sample gas with first air flow in said burner pipe,
   (c) a combustion pipe surrounding said burner pipe for guiding a second air flow upwards between said (f) a diluted-gas-guidance taper pipe converging upwardly for upwardly directing the air diluted combustion gas while thoroughly intermixing the combustion gas and the third air flow sufficiently, the lower end of said guidance taper pipe being fixed to the upper end of said air injection taper pipe,
   (g) a temperature detection taper pipe converging upwardly and having a multiplicity of holes in the wall for rapidly ejecting the diluted combustion gas out through said holes while upwardly directing the diluted combustion gas, the lower end of said temperature detection taper pipe being fixed to the upper end of said diluted combustion gas guidance taper pipe, (h) an exhaust pipe surrounding said temperature detection taper pipe for upwardly directing said diluted combustion gas as ejected radially out through said multiplicity of holes, the lower end of said exhaust pipe being fixed to the lower end of said temperature detection taper pipe and the upper end extending higher than the upper end of said temperatude detection taper pipe, (i) pipe means including at least one single pipe surrounding said exhaust pipe and said diluted combustion gas guidance taper pipe for shielding for ambient temperature, the upper end of said pipe being made higher than the upper end of said exhaust pipe, and (j) two temperature detecting elements, one being provided in the vicinity of said third air flow inlet, and the other in said temperature detection taper pipe for detecting the difference of temperature between the third air flow and the air diluted combustion gas which serves for continuously determining the calorific value of combustible gas.

2. The apparatus as defined in claim 1 wherein:

(a) the temperature detecting elements of paragraph (j) are in the form of first and second thermocouples with that provided in the temperature detecing taper pipe being the second thermocouple;

(b) a third thermocouple of a type similar to said second thermocouple, but having twice the heat capacity thereof, said third thermocouple connected to said second thermocouple in reverse-polarity relationship, (c) a fourth thermocouple of a type similar to said second thermocouple and having the same heat capacity thereof, said fourth thermocouple being connected in series in identical-polarity relationship with the second thermocouple, and (d) the said third and fourth thermocouples being provided in the temperature detecting taper pipe near the second thermocouple.

3. The apparatus as defined in claim 1 further including a heating device attached to said burner pipe of paragraph (b).

4. The apparatus as defined in claim 1 wherein the pipe means of paragraph (i) includes concentrically spaced multi-wall means having means for reversely directing the normally upward flow of the air-diluted combustion gas.

References Cited

UNITED STATES PATENTS

| | | | |
|---|---|---|---|
| 2,349,517 | 5/1944 | Pinkerton | 73—190 |
| 2,448,562 | 9/1948 | Way et al. | 60—39.65 |

JAMES J. GILL, Primary Examiner